(12) United States Patent
Kopecek et al.

(10) Patent No.: US 8,713,911 B2
(45) Date of Patent: May 6, 2014

(54) SYSTEM AND METHOD FOR OPERATING A THRUST REVERSER FOR A TURBOFAN PROPULSION SYSTEM

(75) Inventors: Joseph Thomas Kopecek, Santa Clara, CA (US); Peter William Walker, Moorpark, CA (US)

(73) Assignee: Woodward HRT, Inc., Valencia, CA (US)

( * ) Notice: Subject to any disclaimer, the term of this patent is extended or adjusted under 35 U.S.C. 154(b) by 772 days.

(21) Appl. No.: 12/969,258

(22) Filed: Dec. 15, 2010

(65) Prior Publication Data

US 2012/0151897 A1 Jun. 21, 2012

(51) Int. Cl.
*F02K 3/02* (2006.01)
*F02K 1/72* (2006.01)
*F02K 1/76* (2006.01)

(52) U.S. Cl.
CPC . *F02K 1/72* (2013.01); *F02K 1/763* (2013.01); *F02K 1/766* (2013.01)
USPC ........ 60/226.2; 60/771; 60/226.3; 244/110 B; 239/265.19

(58) Field of Classification Search
CPC ............ F02K 1/72; F02K 1/763; F02K 1/766
USPC .......... 60/226.2, 230, 226.3, 771; 244/110 B; 239/265.29, 265.31, 265.19, 265.27
See application file for complete search history.

(56) References Cited

U.S. PATENT DOCUMENTS

| | | | |
|---|---|---|---|
| 3,493,178 A * | 2/1970 | Bruner | 239/265.13 |
| 3,779,010 A * | 12/1973 | Chamay et al. | 60/226.2 |
| 3,814,324 A * | 6/1974 | Wanger | 239/265.31 |
| 4,922,713 A | 5/1990 | Barbarin et al. | |
| 5,609,020 A * | 3/1997 | Jackson et al. | 60/226.2 |
| 5,655,360 A | 8/1997 | Butler | |
| 5,778,659 A | 7/1998 | Duesler et al. | |
| 5,806,302 A | 9/1998 | Cariola et al. | |
| 6,021,636 A * | 2/2000 | Johnson et al. | 60/226.2 |
| 6,546,715 B1 * | 4/2003 | Blevins et al. | 60/226.2 |
| 6,810,656 B2 * | 11/2004 | Kortum et al. | 60/226.2 |
| 6,935,097 B2 * | 8/2005 | Eschborn | 60/226.2 |
| 7,007,454 B2 | 3/2006 | Dehu et al. | |
| 7,146,796 B2 | 12/2006 | Lair | |
| 7,264,203 B2 | 9/2007 | Lair | |
| 7,559,507 B2 | 7/2009 | Harrison et al. | |
| 7,600,371 B2 | 10/2009 | Sternberger | |
| 7,690,190 B2 | 4/2010 | Thornock et al. | |

(Continued)

*Primary Examiner* — William H Rodriguez
(74) *Attorney, Agent, or Firm* — Fish & Richardson P.C.

(57) ABSTRACT

A thrust reverser assembly for use in a turbofan engine assembly. The engine assembly includes a core gas turbine engine and a core cowl which circumscribes the core gas turbine engine. A nacelle is positioned radially outward from the core cowl to define a fan nozzle duct between the core cowl and a portion of the nacelle. The nacelle includes a stationary cowl. The thrust reverser assembly includes a first translating cowl that is slidably coupled to the nacelle. The first translating cowl is positionable with respect to the stationary cowl. A second translating cowl is slidably coupled to the nacelle such that the first translating cowl is positioned between the stationary cowl and the second translating cowl. The second translating cowl is positionable with respect to the first translating cowl. A positioning assembly is coupled to the first translating cowl. An actuator assembly is operatively coupled to the second translating cowl for selectively moving the second translating cowl. The actuator assembly is configured to engage the positioning assembly to selectively move the first translating cowl.

16 Claims, 6 Drawing Sheets

(56) References Cited

U.S. PATENT DOCUMENTS

| | | |
|---|---|---|
| 7,735,778 B2 | 6/2010 | Lair et al. |
| 8,127,531 B2 * | 3/2012 | Parham ................. 60/226.3 |
| 8,615,982 B2 * | 12/2013 | Sundstrom et al. .......... 60/226.3 |
| 2004/0195432 A1 * | 10/2004 | Christensen .................. 244/10 |
| 2010/0077879 A1 * | 4/2010 | Davies et al. ................ 74/89.38 |
| 2011/0192135 A1 * | 8/2011 | McKay et al. ............... 60/226.2 |
| 2013/0075494 A1 * | 3/2013 | Vaughan et al. ......... 239/265.29 |

* cited by examiner

SYSTEM AND METHOD FOR OPERATING A THRUST REVERSER FOR A TURBOFAN PROPULSION SYSTEM

BACKGROUND OF THE INVENTION

The field of the invention relates generally to aircraft gas turbine propulsion systems, and more particularly to a system and method for operating a thrust reverser for a turbofan propulsion system.

At least some known turbofan engines include a fan assembly, a core gas turbine engine enclosed in an annular core cowl, and a fan nacelle that surrounds a portion of the core gas turbine engine. The fan nacelle is spaced radially outward from the annular core cowl such that the core cowl and fan nacelle form a fan nozzle duct having a discharge area.

At least some known turbofan propulsion systems include a thrust reverser assembly. At least some known thrust reverser assemblies include a first fixed cowl, a second cowl that is axially translatable with respect to the first cowl, and a third cowl that is axially translatable with respect to the second cowl. More specifically, in some known thrust reverser assemblies, a first actuator is coupled to the second and third cowls and is actuated to reposition the second cowl with respect to the first cowl. In addition, a second actuator is coupled to the third cowl and is actuated to reposition the third cowl with respect to the second cowl. During operation of at least some known turbofan engines, the second cowl is repositioned to channel at least a portion of airflow discharged from the fan nozzle duct through the thrust reverser actuation system to facilitate adjusting a direction of thrust discharged from the turbofan engine. The third cowl is repositioned to vary the discharge area of the fan nozzle duct to adjust the thrust of the turbofan engine.

Known thrust reverser assemblies are generally subjected to operational detriments such as, extreme temperatures and general mechanical wear. Over time, depending on the use of the thrust reverser assembly and the duration and strength of such detriments, known thrust reverser assembly components may be subjected to stresses that cause fatigue cracking and/or failure, which may eventually cause suboptimal performance of the thrust reverser assembly.

An example of such thrust reverser assemblies are shown in U.S. Pat. No. 5,778,659 ("the '659" patent) and U.S. Pat. No. 5,806,302 ("the '302" patent). The '659 patent describes a thrust reverser assembly that includes a thrust reverser, an exhaust nozzle, a dedicated thrust reverser actuation system for translating the thrust reverser, and a dedicated sleeve actuation system for translating the exhaust nozzle. The '302 patent describes a thrust reverser that includes a first actuator that is coupled to a thrust reverser cowl, and a second actuator that is coupled to an exhaust nozzle. Each thrust reverser assembly described in the '659 patent and the '302 patent includes dedicated actuators for each translating cowl that may increase the cost, weight, and/or maintenance of the thrust reverser assembly.

U.S. Pat. No. 4,922,713 ("the '713" patent) describes a thrust reverser that includes a first movable cowl, a second movable cowl, and an actuation system that is operatively interposed between a stationary cowl and the second cowl for moving the first and second cowls. In addition, the thrust reverser assembly shown in the '713 patent includes a first locking system for locking the first cowl to the stationary cowl, and a second locking system for locking the second cowl to the first cowl. By including the second locking system between the first cowl and the second cowl, the thrust reverser assembly shown in the '713 patent may require flexible hoses and/or electrical cables to bridge a gap defined between the stationary cowl and the first cowl during operation, which undesirably exposes these components to adverse environmental conditions.

Another example of a thrust reverser assembly is shown in U.S. Pat. No. 5,655,360 ("the '360" patent). The '360 patent describes a thrust reverser that includes a forward stationary cowl, an aft translating cowl, and a deflector door that is coupled to the aft cowl and is selectively deployable when the aft cowl moves from a stowed position to a fully deployed position. The deflector door is positioned within a slot that is defined by a core cowl and is sized to enable the deflector door to translate an axial distance within the slot before being deployed.

BRIEF DESCRIPTION OF THE INVENTION

In one aspect, a thrust reverser assembly for use in a turbofan engine assembly is provided. The engine assembly includes a core gas turbine engine and a core cowl which circumscribes the core gas turbine engine. A nacelle is positioned radially outward from the core cowl to define a fan nozzle duct between the core cowl and a portion of the nacelle. The nacelle includes a stationary cowl. The thrust reverser assembly includes a first translating cowl that is slidably coupled to the nacelle. The first translating cowl is positionable with respect to the stationary cowl. A second translating cowl is slidably coupled to the nacelle such that the first translating cowl is positioned between the stationary cowl and the second translating cowl. The second translating cowl is positionable with respect to the first translating cowl. A positioning assembly is coupled to the first translating cowl. An actuator assembly is operatively coupled to the second translating cowl for selectively moving the second translating cowl. The actuator assembly is configured to engage the positioning assembly to selectively move the first translating cowl.

In another aspect, a turbofan engine assembly is provided. The turbofan engine assembly includes a core gas turbine engine and a core cowl which circumscribes the core gas turbine engine. A nacelle is positioned radially outward from the core cowl to define a fan nozzle duct between the nacelle and the core cowl. The nacelle includes a stationary cowl. A thrust reverser assembly is coupled to the nacelle for adjusting a thrust of the gas turbine engine. The thrust reverser assembly includes a first translating cowl that is slidably coupled to the nacelle. The first translating cowl is positionable with respect to the stationary cowl. A second translating cowl is slidably coupled to the nacelle such that the first translating cowl is positioned between the stationary cowl and the second translating cowl. The second translating cowl is positionable with respect to the first translating cowl. A positioning assembly is coupled to the first translating cowl. An actuator assembly is operatively coupled to the second translating cowl for selectively moving the second translating cowl. The actuator assembly is configured to engage the positioning assembly to selectively move the first translating cowl.

In yet another aspect, a method for operating a turbofan engine assembly is provided. The turbofan engine assembly includes a core gas turbine engine and a core cowl which circumscribes the core gas turbine engine. A nacelle is positioned radially outward from the core cowl to define a fan nozzle duct between the core cowl and a portion of the nacelle. A stationary cowl is coupled to the nacelle. A first translating cowl is coupled to the nacelle and is positionable with respect to the stationary cowl. A second translating cowl is coupled to the nacelle and is positionable with respect to the first translating cowl. A thrust reverser assembly is coupled to the nacelle. The method includes selectively positioning the second translating cowl between a first operational position and a second operational position to adjust an area of the fan nozzle duct. The first translating cowl is selectively positioned between the first operational position and a third operational position to adjust and amount of air flowing through the fan duct nozzle and the thrust reverser assembly to facilitate effecting reverse thrust of the turbofan engine assembly.

DETAILED DESCRIPTION OF THE INVENTION

The exemplary methods and systems described herein overcome at least some disadvantages of known turbofan propulsion systems by providing a thrust reverser assembly that facilitates adjusting an airflow discharged from a turbofan engine assembly. Moreover, the thrust reverser assembly includes a first translating cowl and a second translating cowl that each are positionable with respect to a stationary cowl to adjust an discharge area that is defined between the second translating cowl and the turbofan engine assembly. In addition, the thrust reverser assembly includes an actuator that is operatively couple to the second translating cowl, and a positioning assembly that is configured to engage the actuator to selectively move the first translating cowl. By selectively positioning the first and second translating cowls, the thrust reverser assembly facilitates adjusting an airflow discharged through the turbofan propulsion system to increase an operational efficiency of the turbofan propulsion system.

Figure 1:
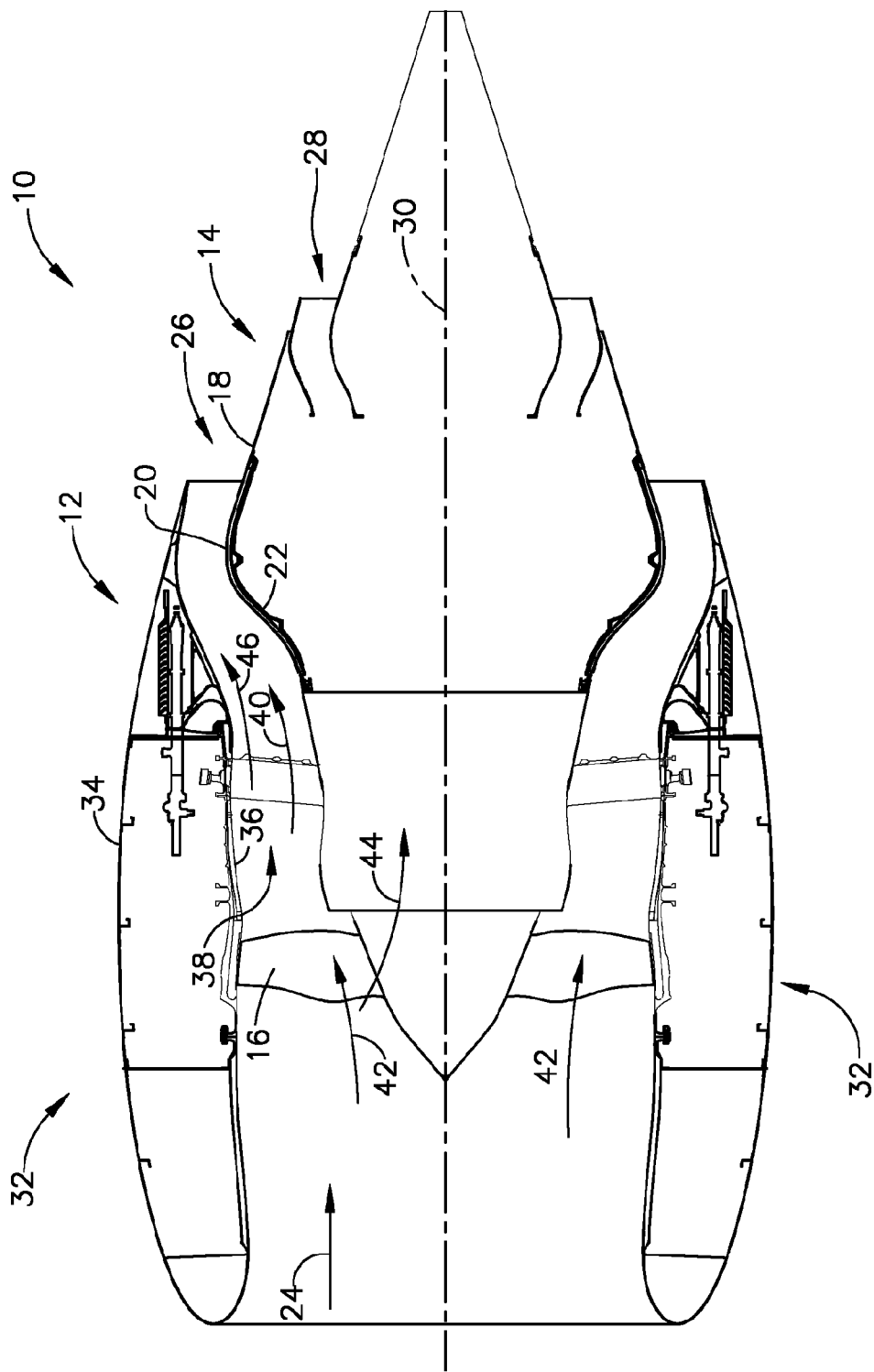
FIG. 1 is a sectional view of an exemplary aircraft turbofan engine assembly that includes an exemplary thrust reverser assembly.

FIG. 1 is a side view of an exemplary aircraft turbofan engine assembly 10 that includes an exemplary thrust reverser assembly 12. Turbofan engine assembly 10 may be coupled to an aircraft wing (not shown) for use in generating a thrust to propel the aircraft. In the exemplary embodiment, turbofan engine assembly 10 includes a core gas turbine engine 14 that includes a high-pressure compressor, a combustor, and a high-pressure turbine (all not shown). Turbofan engine assembly 10 also includes a low-pressure turbine (not shown) that is disposed axially downstream from core gas turbine engine 14, and a fan assembly 16 that is disposed axially upstream from core gas turbine engine 14. In the exemplary embodiment, turbofan engine assembly 10 includes an annular core cowl 18 that extends around core gas turbine engine 14 and includes a radially outer surface 20 and a radially inner surface 22. Turbofan engine assembly 10 also includes an inlet 24, a first outlet 26, and a second outlet 28 and defines a centerline axis 30 that extends between inlet 24 and first and second outlets 26 and 28.

In the exemplary embodiment, turbofan engine assembly 10 also includes a fan nacelle 32 that surrounds fan assembly 16. Nacelle 32 includes a radially outer surface 34 and a radially inner surface 36, and is spaced radially outward from core cowl 18 such that a fan nozzle duct 38 is defined between radially outer surface 20 of core cowl 18 and radially inner surface 36 of nacelle 32. A flow path 40 is defined within fan nozzle duct 38 and extends from inlet 24 to first outlet 26.

During operation, airflow 42 enters inlet 24, flows through fan assembly 16, and is discharged downstream. A first portion 44 of airflow 42 is channeled through core gas turbine engine 14, compressed, mixed with fuel, and ignited for generating combustion gases which are discharged from core gas turbine engine 14 through second outlet 28. A second portion 46 of airflow 42 is channeled downstream from inlet 24 through fan nozzle duct 38 and is discharged from fan nozzle duct 38 through first outlet 26.

Figure 2:
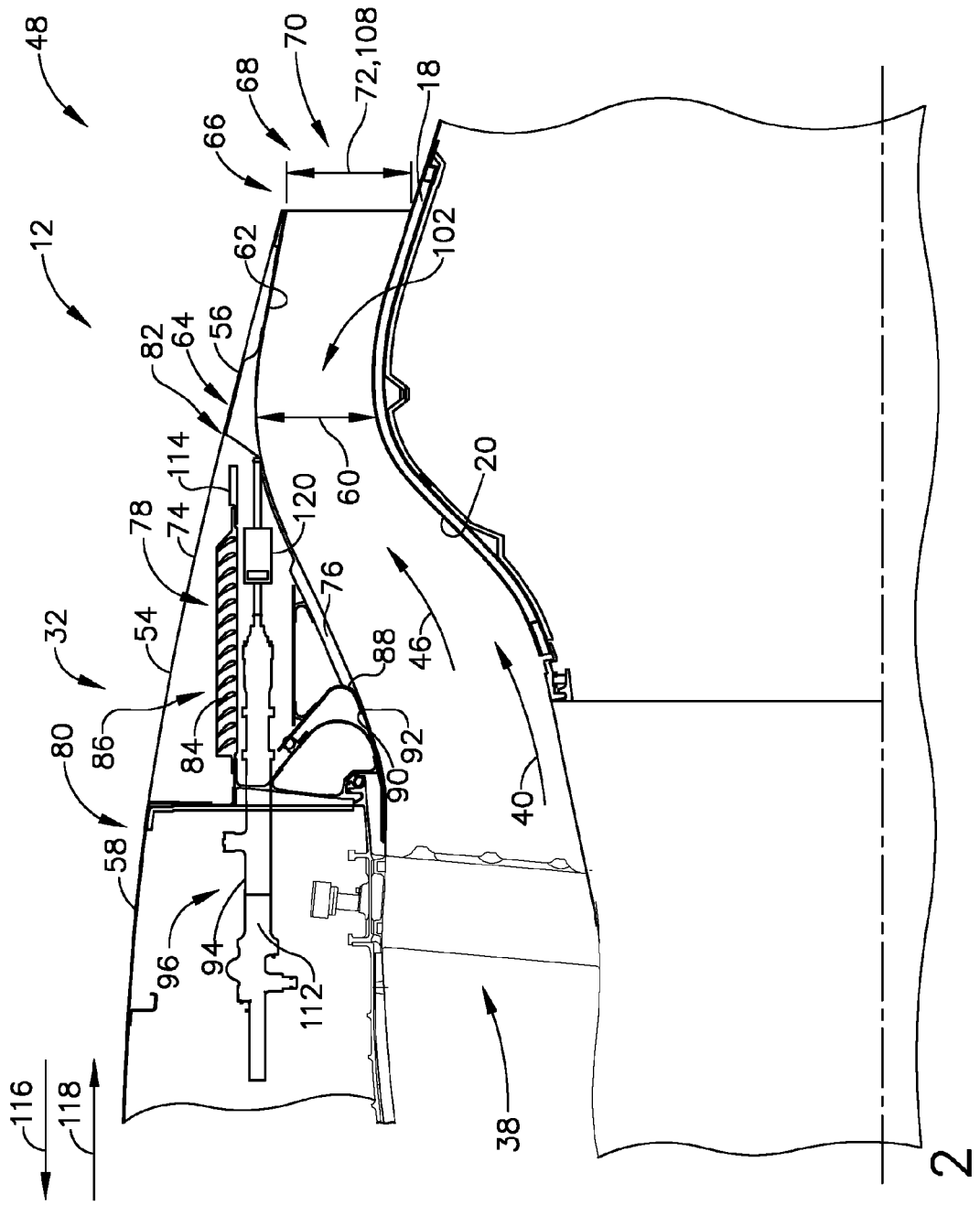
FIG. 2 is a partial side sectional view of the thrust reverser assembly shown in FIG. 1 in a first operational position.
Figure 3:
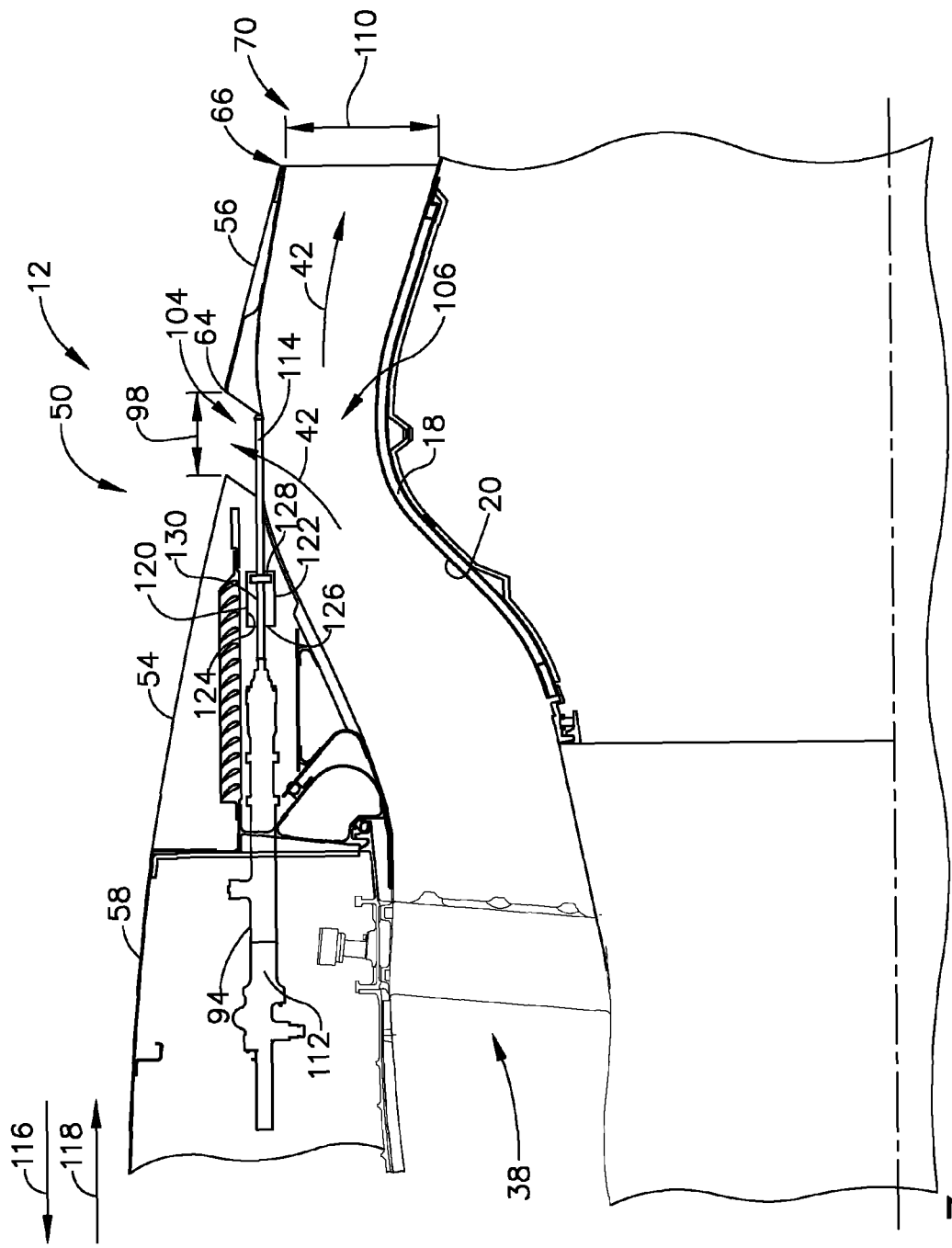
FIG. 3 is a partial side sectional view of the thrust reverser assembly shown in FIGS. 1 and 2 in a second operational position.
Figure 4:
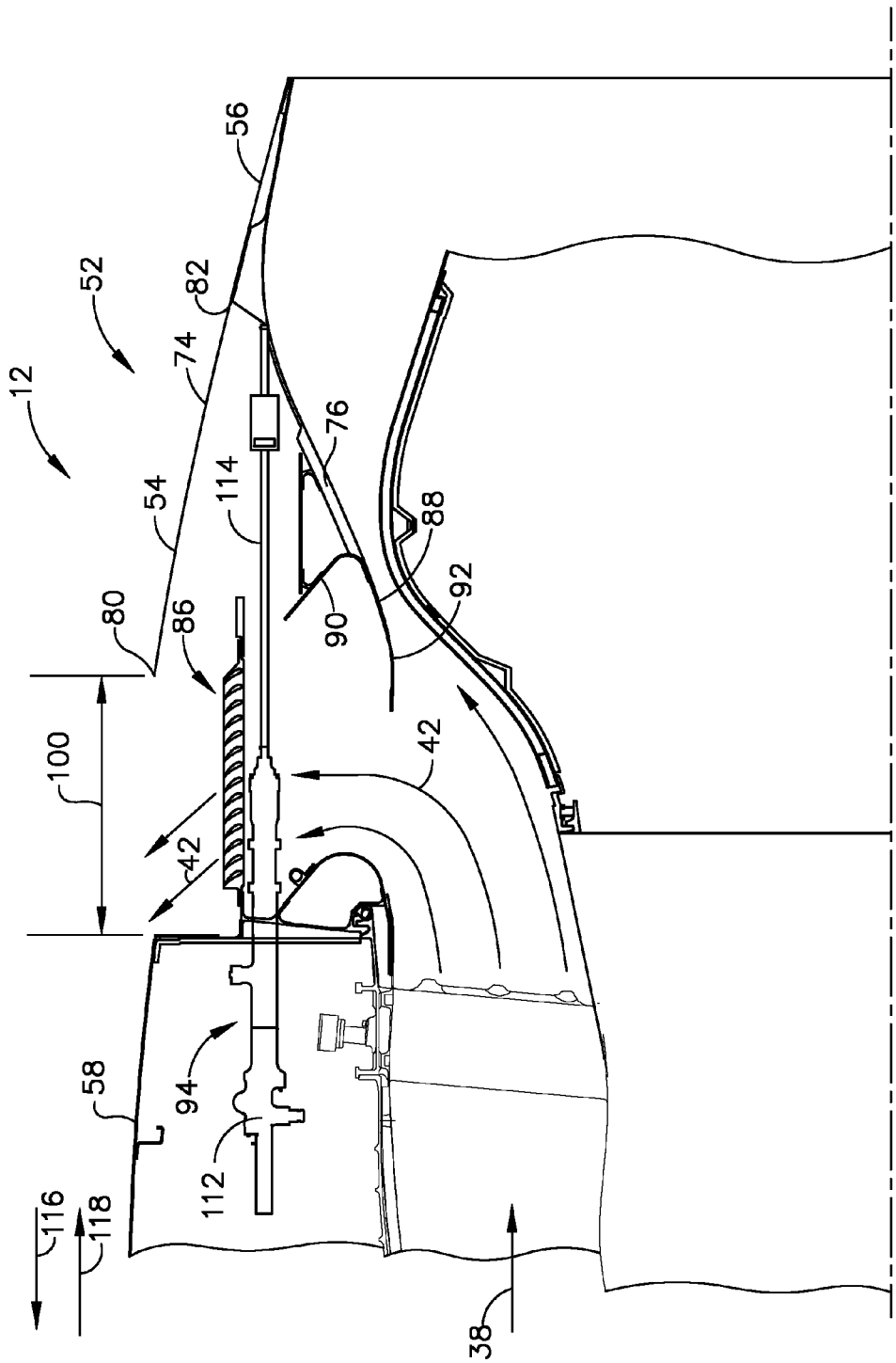
FIG. 4 is a partial side sectional view of the thrust reverser assembly shown in FIGS. 1 and 2 in a third operational position.

FIG. 2 is a partial sectional side view of thrust reverser assembly 12 in a first operational position 48. FIG. 3 is a partial sectional side view of thrust reverser assembly 12 in a second operational position 50. FIG. 4 is a partial sectional side view of thrust reverser assembly 12 in a third operational position 52. Identical components shown in FIGS. 2-4 are labeled with the same reference numbers used in FIG. 1. In the exemplary embodiment, thrust reverser assembly 12 includes a first translating aft cowl 54, i.e. a thrust reverser cowl, and a second translating aft cowl 56, i.e. a fan nozzle cowl. First translating aft cowl 54 and second translating aft cowl 56 each are slidably coupled to a stationary forward cowl 58 to form nacelle 32. Stationary forward cowl 58 is fixedly coupled to nacelle 32. First translating aft cowl 54 is positioned between second translating aft cowl 56 and stationary cowl 58. First and second translating aft cowls 54 and 56 surround core cowl 18 and are spaced radially outward from core cowl 18 to define fan nozzle duct 38 that includes a discharge area 60 that varies along flow path 40.

In the exemplary embodiment, second translating aft cowl 56 includes a radially inner surface 62 that extends between a forward end 64 and an opposite aft end 66. Aft end 66, with a portion of core cowl 18, defines a discharge nozzle 68 having an area sized to enable airflow second portion 46, that is channeled through fan nozzle duct 38, to be discharged through discharge nozzle 68 during selected operations. In one embodiment, aft end 66 is positioned with respect to core cowl 18 to define a throat region 70 of fan nozzle duct 38. Throat region 70 defines a minimum cross-sectional area 72 of fan nozzle duct 38.

In the exemplary embodiment, first translating aft cowl 54 includes a radially outer panel 74 and a radially inner panel 76 that is coupled to radially outer panel 74 such that a cavity 78 is defined between outer and inner panels 74 and 76, respectively. Each panel 74 and 76 extends generally axially between a forward end 80 and an aft end 82.

In the exemplary embodiment, thrust reverser assembly 12 includes a plurality of cascade turning vanes 84 that extend outward from stationary forward cowl 58 and form a cascade box 86 that surrounds core cowl 18. Cascade turning vanes 84 are oriented to channel air towards a forward portion of an aircraft (not shown) to facilitate effecting reverse thrust. Cascade box 86 is positioned between, or at the juncture of, first translating aft cowl 54 and stationary forward cowl 58, and is selectively uncovered upon axial translation of first translating aft cowl 54. Cavity 78 is sized and shaped to house cascade box 86 therein when first translating aft cowl 54 is in first operational position 48. First translating aft cowl 54 selectively positions cascade box 86 in flow communication with second portion 46 of airflow 42 channeled through fan nozzle duct 38 with first translating aft cowl 54 in third operational position 52.

In the exemplary embodiment, thrust reverser assembly 12 includes a flow directing assembly 88 that is coupled to forward end 80 of first translating aft cowl 54. Alternatively, flow directing assembly 88 may be formed integrally with first translating aft cowl 54. Flow directing assembly 88 includes an inner surface 90 and an outer surface 92, and is oriented with respect to first translating aft cowl 54 such that inner surface 90 at least partially defines cavity 78, and outer surface 92 at least partially defines fan nozzle duct 38. As shown in FIG. 2, first translating aft cowl 54 is positioned in first operational position 48, also known as a stowed configuration, such that cascade box 86 is substantially covered by first translating aft cowl 54 and such that airflow 42 is channeled through fan nozzle duct 38 and is discharged through discharge nozzle 68. As shown in FIG. 4, first translating aft cowl 54 is positioned in third operational position 52 such that flow directing assembly 88 is positioned within fan nozzle duct 38 and channels a portion of airflow 42 through cascade box 86. In an alternative embodiment, flow directing assembly 88 includes a plurality of blocker doors (not shown) that are pivotably coupled to inner panel 76 and selectively positionable within fan nozzle duct 38 to channel airflow 42 from fan nozzle duct 38 to cascade box 86.

In the exemplary embodiment, thrust reverser assembly 12 also includes an actuator assembly 94 that is operatively coupled to first translating aft cowl 54 and to second translating aft cowl 56 to selectively translate first and second translating aft cowls 54 and 56 in a generally axial direction relative to stationary forward cowl 58 to vary the amount of air discharged through discharge nozzle 68. Actuator assembly 94 includes a locking system 96 for selectively locking first translating aft cowl 54 to stationary forward cowl 58.

In the exemplary embodiment, actuator assembly 94 may include, but is not limited to including, an electrically, a pneumatically, and/or hydraulically powered system to move first and second translating aft cowls 54 and 56 between first operational position 48, second operational position 50, and third operational position 52. In first operational position 48, first and second translating aft cowls 54 and 56 are stowed such that first translating aft cowl 54 is fully retracted against stationary forward cowl 58 and locked in the stowed position, and second translating aft cowl 56 is fully retracted against first translating aft cowl 54. In second operational position 50, second translating aft cowl 56 is translated to a position a distance 98 aftward and away from first translating aft cowl 54. In third operational position, first translating aft cowl 54 is translated to a position a distance 100 aftward and away from stationary forward cowl 58.

In first operational position 48, fan nozzle duct 38 has a first discharge area 102 defined between radially outer surface 20 of core cowl 18 and second translating aft cowl 56. In second operational position 50, second translating aft cowl 56 is deployed aftward and away from first translating aft cowl 54 such that a flow channel 104 is defined between first translating aft cowl 54 and second translating aft cowl 56 and fan nozzle duct 38 has a second discharge area 106 that is larger than first discharge area 102. Flow channel 104 is sized and shaped to discharge a portion of airflow 42 through flow channel 104. In one embodiment, in first operational position 48, aft end 66 of second translating aft cowl 56 defines throat region 70 having a first cross-sectional area 108, and defines throat region 70 having a second cross-sectional area 110 that is larger than first cross-sectional area 108 with second translating aft cowl 56 in second operational position 50.

In the exemplary embodiment, in third operational position 52, first translating aft cowl 54 is fully extended from stationary forward cowl 58 to position cascade box 86 in flow communication with second portion 46 of airflow 42 that is channeled through fan nozzle duct 38. Inner surface 90 of flow directing assembly 88 is adjacent outer surface 20 of core cowl 18 to reduce airflow 42 being discharged through discharge nozzle 68 and channel substantially all of second portion 46 of airflow 42 through cascade box 86 to facilitate effecting reverse thrust to slow the aircraft.

In the exemplary embodiment, actuator assembly 94 includes a plurality of circumferentially-spaced actuators 112, i.e. motors, and a plurality of extending rod assemblies 114 that include, but are not limited to including, ball screws. In one embodiment, each actuator 112 is positioned within a portion of the area defined by nacelle 32. In the exemplary embodiment, each rod assembly 114 is coupled to a respective actuator 112 and to second translating aft cowl 56 such that energizing actuators 112 facilitates moving or translating first and second translating aft cowls 54 and 56 in either a forward direction 116 or an aft direction 118 depending on the rotation produced by the energization of actuators 112. Operation of actuator assembly 94 enables first and second translating aft cowls 54 and 56 to translate from first operational position 48, to second operational position 50, and to third operational position 52, or to be returned to first operational position 48 depending on the energization of actuators 112.

In the exemplary embodiment, thrust reverser assembly 12 includes a positioning assembly 120 that is coupled to first translating aft cowl 54. Positioning assembly 120 includes a positioning member 122 that has an inner surface 124 that extends between a forward sidewall 126 and an aft sidewall 128 such that a positioned slot 130 is defined between forward sidewall 126 and aft sidewall 128. Positioning slot 130 is configured to receive at least a portion of rod assembly 114 therein. Forward sidewall 126 is positioned closer to forward end 80 of first translating aft cowl 54 than aft sidewall 128.

In the exemplary embodiment, rod assembly 114 is at least partially positioned within positioning slot 130 to engage positioning assembly 120 to facilitate moving first translating aft cowl 54 between first operational position 48 and third operational position 52. During operation, actuator assembly 94 extends rod assembly 114 in an aft direction 118 to deploy second translating aft cowl 56 from first operational position 48 to second operational position 50 with first translating aft cowl 54 locked in the stowed position. As second translating aft cowl 56 is deployed to second operational position 50, rod assembly 114 contacts aft sidewall 128 of positioning member 122 to position second translating aft cowl 56 in second operational position 50. Actuator assembly 94 unlocks first translating aft cowl 54 from stationary forward cowl 58 and extends rod assembly 114 in aft direction 118 to move first and second translating aft cowls 54 and 56 to third operational position 52.

Figure 5:
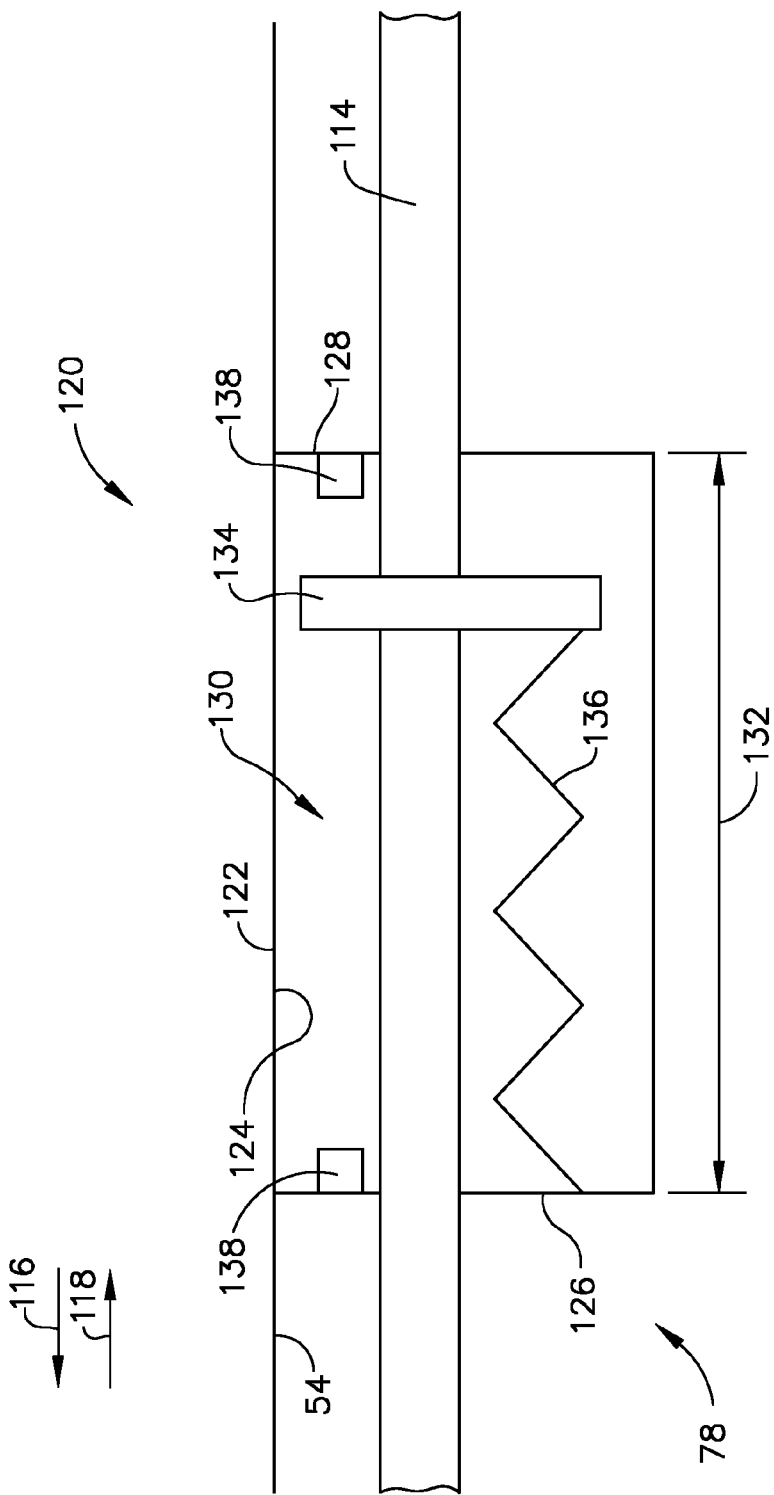
FIG. 5 is a schematic view of an exemplary positioned assembly suitable for use with the aircraft turbofan engine assembly shown in FIG. 1.

FIG. 5 is a schematic view of positioning assembly 120. Identical components shown in FIG. 5 are labeled with the same reference numbers used in FIG. 2. In the exemplary embodiment, positioning member 122 is coupled to first translating aft cowl 54 and positioned within cavity 78. Positioning slot 130 has a length 132 defined between forward sidewall 126 and aft sidewall 128 that is approximately equal to distance 98 of second translating aft cowl 56 in second operational position 50. In the exemplary embodiment, rod assembly 114 extends through forward and aft sidewalls 126 and 128, and is at least partially positioned within slot 130. Positioning assembly 120 includes a positioning nut 134 that is coupled to rod assembly 114 and is positioned within slot 130. Positioning nut 134 is configured to contact aft sidewall 128 when rod assembly 114 is moved in aft direction 118, and to contact forward sidewall 126 when rod assembly 114 is moved in forward direction 116. In one embodiment, positioning assembly 120 includes a rod extension (not shown) that is coupled between second translating aft cowl 56 and rod assembly 114. In such an embodiment, the rod extension is coupled to rod assembly 114 to form an articulated joint (not shown) that is positioned within slot 130 and is configured to contact positioning member 122 to move first translating aft cowl 54. In the exemplary embodiment, a biasing member 136, such as, for example a spring, is coupled between positioning nut 134 and forward sidewall 126 to bias positioning nut 134 and rod assembly 114 towards forward sidewall 126. In one embodiment, forward and aft sidewalls 126 and 128 include a damping member 138 that extends outward from forward sidewall 126 and aft sidewall 128, respectively, to contact positioning nut 134 during operation of positioning assembly 120.

Figure 6:
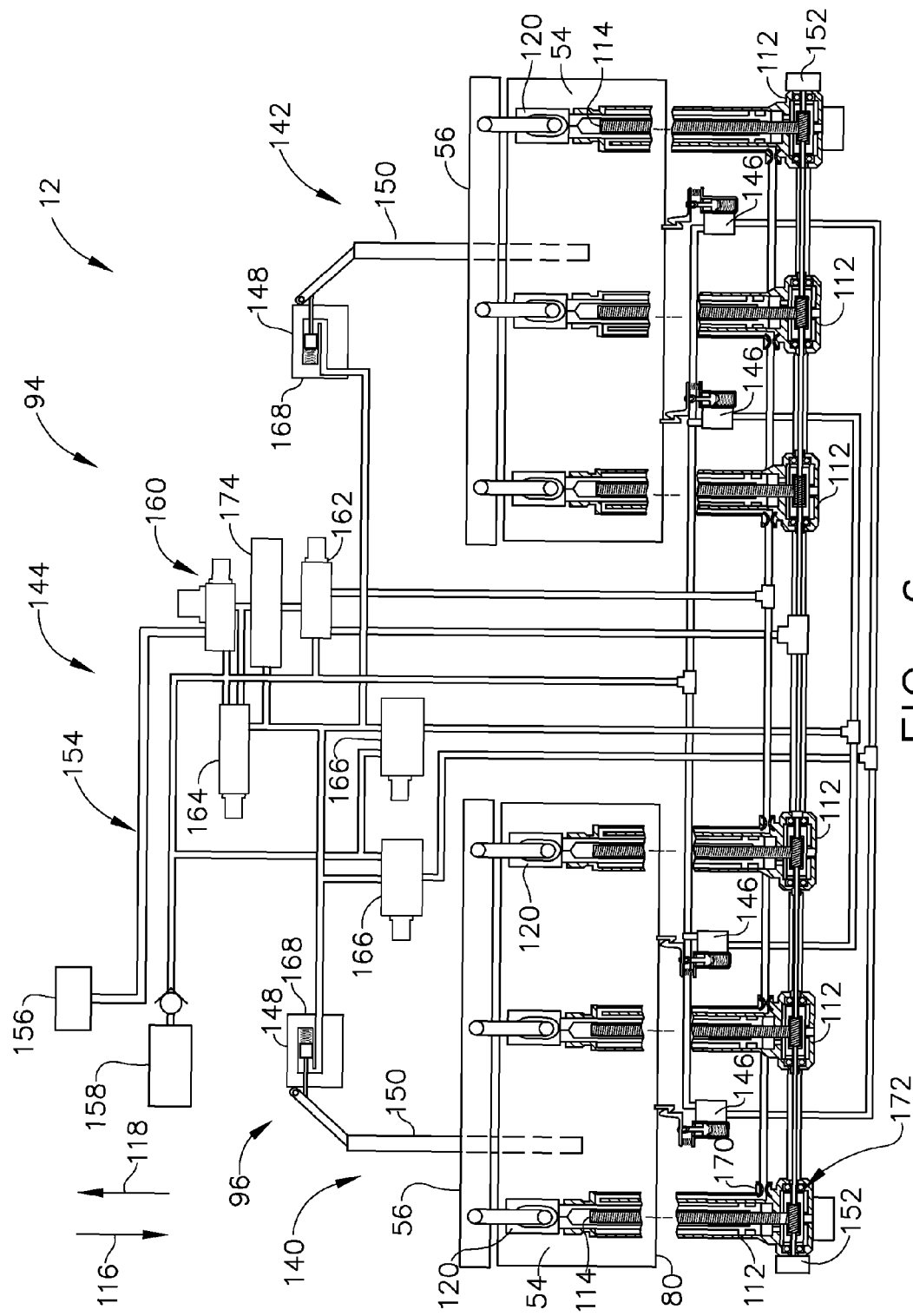
FIG. 6 is a schematic view of the thrust reverser assembly shown in shown in FIG. 1.

FIG. 6 is a schematic view of thrust reverser assembly 12. Identical components shown in FIG. 6 are labeled with the same reference numbers used in FIG. 2. In the exemplary embodiment, first and second translating aft cowls 54 and 56 each include a first portion 140 and a second portion 142. First portion 140 is substantially similar to second portion 142. In the exemplary embodiment, actuator assembly 94 includes a control system 144 that is coupled to locking system 96 and to each actuator 112 for controlling an operation of thrust reverser assembly 12. Locking system 96 includes a plurality of cowl locks 146 and a plurality of track locks 148. Each cowl lock 146 is coupled to stationary forward cowl 58 (shown in FIG. 2) and is configured to selectively engage forward end 80 of first translating aft cowl 54 to releasably lock first translating aft cowl 54 to stationary forward cowl 58 to prevent a movement of first translating aft cowl 54 in aft direction 118. In the exemplary embodiment, first translating aft cowl 54 includes a plurality of slider assemblies 150 that are slidably coupled to stationary forward cowl 58 to facilitate moving first translating aft cowl 54 with respect to stationary forward cowl 58. Each track lock 148 is coupled to stationary forward cowl 58 and is configured to selectively engage slider assembly 150 to releasably lock first translating aft cowl 54 to stationary forward cowl 58. One or more actuators 112 include an actuator lock 152 that is configured to selectively lock rod assembly 114 in the stowed position such that second translating aft cowl 56 is locked to stationary forward cowl 58 to prevent a movement of second translating aft cowl 56 in aft direction 118. Additionally, with second translating aft cowl 56 locked to stationary forward cowl 58, second translating aft cowl 56 prevents a movement of first translating aft cowl 54 in aft direction 118.

In the exemplary embodiment, control system 144 includes a hydraulic fluid system 154 that includes a hydraulic pressure system 156 for maintaining a suitable pressure in control system 144 to facilitate energizing control system 144, cowl locks 146, track lock 148, and/or actuators 112. Control system also includes a pressure release system 158 for reducing hydraulic pressure in control system 144 to facilitate de-energizing energizing control system 144, cowl locks 146, track lock 148, and/or actuators 112. In the exemplary embodiment, control system 144 includes a hydraulic isolation valve 160, a directional control valve 162, a lock isolation valve 164, a plurality of cowl lock valves 166, and a plurality of slide lock valves 168. Hydraulic isolation valve 160 is operatively coupled to directional control valve 162 to selectively energize directional control valve 162.

Directional control valve 162 is operatively coupled to each actuator 112 to selectively energize each actuator 112 to move actuator 112 between a stowed position and a deployed position. In one embodiment, each actuator 112 includes a stow port 170 and a deploy port 172. Directional control valve 162 operates to selectively channel hydraulic fluid to stow port 170 and/or deploy port 172. Directional control valve 162 channels hydraulic fluid to stow port 170 to operate actuator 112 and retract rod assembly 114 in forward direction 116 to move first and second translating aft cowls 54 and 56 to first operational position 48. Directional control valve 162 also channels hydraulic fluid to stow port 170 and to deploy port 172 to unlock actuator lock 152, and to equalize pressure within actuator 112 such that actuator 112 operates to extend rod assembly 114 in aft direction 118 to move first and second translating aft cowls 54 and 56 from first operational position 48 to second operational position 50, and from first operational position 48 to third operational position 52.

In the exemplary embodiment, a piloting flow orifice assembly 174 is coupled between hydraulic isolation valve 160 and directional control valve 162 to regulate a flowrate of hydraulic fluid from hydraulic isolation valve 160 to directional control valve 162 to maintain an operating speed of actuators 112. Piloting flow orifice assembly 174 enables actuators 112 to operate at a slow deployment speed when second translating aft cowl 56 is moved from first operational position 48 to second operational position 50, and enables actuators 112 to deploy at a high deployment speed when first and second translating aft cowls 54 and 56 are moved from first operational position 48 to third operational position 52. In one embodiment, lock isolation valve 164 is coupled to piloting flow orifice assembly 174 to operate a piloting device (not shown) positioned within piloting flow orifice assembly 174 to bypass an orifice (not shown) contained therein, to enable directional control valve 162 to operate actuators 112 at the high deployment speed when lock isolation valve 164 is energized. Alternatively, an electro-hydraulic servovalve may be coupled between hydraulic isolation valve 160 and directional control valve 162 for adjusting an operating speed of actuators 112.

In the exemplary embodiment, hydraulic isolation valve 160 is also operatively coupled to lock isolation valve 164 to selectively energize lock isolation valve 164. Lock isolation valve 164 is operatively coupled to each cowl lock valve 166, and to each slide lock valve 168 for selectively energizing cowl lock and slide lock valves 166 and 168. Each cowl lock valve 166 is coupled to a plurality of cowl locks 146 for selectively energizing each cowl lock 146 to engage forward end 80 of first translating aft cowl 54 to releasably lock first translating aft cowl 54 to stationary forward cowl 58. Each slide lock valve 168 is coupled to a respective track lock 148 for selectively energizing track lock 148 to engage a corresponding slider assembly 150 to releasably lock first translating aft cowl 54 to stationary forward cowl 58.

During operation, in first operational position 48, hydraulic isolation valve 160 isolates control system 144 from hydraulic pressure system 156. Hydraulic isolation valve 160 is energized to channel hydraulic fluid from hydraulic pressure system 156 to control system 144 to enable first and second translating aft cowls 54 and 56 to be deployed. During deployment of second translating aft cowl 56 from first operational position 48 to second operational position 50, track lock 148 and cowl lock 146 each are engaged to lock first translating aft cowl 54 to stationary forward cowl 58. Directional control valve 162 channels fluid to deploy port 172 and to stow port 170 of each actuator 112 to unlock actuator lock 152 and to energize actuators 112 to extend rod assembly 114 and move second translating aft cowl 56 from first operational position 48 to second operational position 50. Rod assembly 114 engages positioning assembly 120 such that second translating aft cowl 56 is positioned in second operational position 50. Directional control valve 162 operates to release pressure from deploy port 172 such that pressure is only channeled to stow port 170 causing actuator 112 to retract rod assembly 114 and second translating aft cowl 56 to first operational position 48.

During deployment of first and second translating aft cowls 54 and 56 from first operational position 48 to third operational position 52, lock isolation valve 164 operates to energize cowl lock valve 166 and slide lock valve 168. Cowl lock valve 166 and slide lock valve 168 each operate to energize cowl locks 146 and track locks 148, respectively, to unlock first translating aft cowl 54 from stationary forward cowl 58. Directional control valve 162 channels fluid to deploy port 172 and to stow port 170 to unlock actuator lock 152 and extend rod assembly 114 to move second translating aft cowl 56 in aft direction 118 and to engage positioning assembly 120 to move first translating aft cowl 54 in aft direction 118. In third operational position 52 biasing member 136 urges first translating aft cowl 54 towards second translating aft cowl 56.

As control system 144 operates to stow first and second translating aft cowls 54 and 56, directional control valve 162 operates to release pressure from deploy port 172 such that pressure is only channeled to stow port 170 causing actuator 112 to retract first and second translating aft cowls 54 and 56 to first operational position 48 and lock actuator 112. With first and second translating aft cowls 54 and 56 in first operational position 48, lock isolation valve 164 operates to release pressure from cowl lock valve 166 and slide lock valve 168 such that cowl lock 146 and track lock 148 engage to lock first translating aft cowl 54 to stationary forward cowl 58. Hydraulic isolation valve 160 also isolates control system 144 from hydraulic pressure system 156.

During operation of an aircraft, a pilot/operator may selectively position first and second translating aft cowls 54 and 56 in first, second, or third operational position 48, 50, and 52. For example, the operator may selectively position first and second translating aft cowls 54 and 56 in first operational position (i.e. stowed position) 48 while the aircraft is operating in a takeoff mode or a cruise mode (i.e. during normal flight conditions). In first operational position 48, first and second translating aft cowls 54 and 56 are fully retracted against stationary forward cowl 58 such that substantially all of second portion 46 of airflow 42 discharged from fan assembly 16 is channeled through fan nozzle duct 38 and exits fan nozzle duct 38 at first outlet 26.

When the aircraft is in off-design flight conditions (such as descent, landing, or other low thrust conditions), the pilot/operator may optionally select second operational position (i.e. an intermediate mode of operation) 50 by axially translating second translating aft cowl 56 in aft direction 118 from first operational position 48 while concurrently increasing the fan duct area. Specifically, first discharge area 102 is increased to second discharge area 106 and, as a result, the amount of airflow 42 flowing through fan nozzle duct 38 is increased causing the fan exit pressure to decrease, and therefore the efficiency of fan assembly 16 is increased. In addition, reduced noise is achieved as a result of reduced jet velocity.

When the aircraft has landed, and a pilot/operator desires to effect reverse thrust, an operator may choose to move first and second translating aft cowls 54 and 56 from either the first or second operational position 48 and 50, respectively, to the third operational position 52. Specifically, in the third operational position 52, flow directing assembly 88 channels substantially all of second portion 46 of airflow 42 through cascade box 86 to facilitate effecting reverse thrust to slow the aircraft.

The thrust reverser assembly described herein facilitates reducing damage to the translating cowl and gas turbine propulsion system that results from cracks in portions of the thrust reverser assembly caused by bending forces from movement of the translating cowl. More specifically, the methods and systems described herein facilitate transferring bending loadings from the thrust reverser assembly to the cowl. As such, the operational life of the thrust reverser assembly is extended, which facilitates reduced repair and maintenance costs of gas turbine propulsion systems.

The above-described method, system and apparatus facilitate adjusting an airflow discharged from a turbofan engine assembly. Moreover, the embodiments described herein facilitate adjusting a direction of thrust discharged from the turbofan engine assembly by providing a thrust reverser assembly that selectively positions a first translating cowl and a second translating cowl with respect to a stationary forward cowl to adjust an discharge area that is defined between the first and second translating cowls and the turbofan engine assembly. By selectively positioning the first and second translating cowls, the thrust reverser assembly facilitates adjusting an airflow discharged through the turbofan propulsion system. As such, the embodiments described herein facilitate improving the operation of the turbofan engine assembly to increase an operational efficiency of the turbofan propulsion system.

Exemplary embodiments of a method, system, and apparatus for operating a thrust reverser for a turbofan propulsion system are described above in detail. The system and methods are not limited to the specific embodiments described herein, but rather, components of systems and/or steps of the methods may be utilized independently and separately from other components and/or steps described herein. For example, the methods may also be used in combination with other gas turbine engine systems and methods, and are not limited to practice with only the aircraft engine systems and methods as described herein. Rather, the exemplary embodiment can be implemented and utilized in connection with many other gas turbine propulsion system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A thrust reverser assembly for use in a turbofan engine assembly, the engine assembly including a core gas turbine engine, a core cowl which circumscribes the core gas turbine engine, a nacelle positioned radially outward from the core cowl to define a fan nozzle duct between the core cowl and a portion of the nacelle, the nacelle including a stationary cowl, said thrust reverser assembly comprising:
- a first translating cowl slidably coupled to the nacelle, said first translating cowl positionable with respect to the stationary cowl;
- a second translating cowl slidably coupled to the nacelle such that said first translating cowl is positioned between the stationary cowl and said second translating cowl, said second translating cowl positionable with respect to said first translating cowl;
- an actuator coupled to a positioning assembly, said positioning assembly operatively coupled to said first translating cowl and said second translating cowl for selectively moving said first translating cowl and said second translating cowl; and
- an actuator lock coupled to said actuator to releasably lock said second translating cowl to the stationary cowl.

2. A thrust reverser assembly in accordance with claim 1, wherein said actuator is configured to move said first translating cowl and said second translating cowl between a first operational position, a second operational position, and a third operational position, said first translating cowl and said second translating cowl positioned adjacent the stationary cowl in the first operational position, said second translating cowl positioned a distance from said first translating cowl in the second operational position, and said first translating cowl positioned a distance from the stationary cowl in the third operational position.

3. A thrust reverser assembly in accordance with claim 2, wherein said actuator engages said positioning assembly to move said first translating cowl between the first and third operational positions.

4. A thrust reverser assembly in accordance with claim 2, wherein said actuator comprises a plurality of cowl locks coupled to the stationary cowl to releasably lock said first translating cowl to the stationary cowl.

5. A thrust reverser assembly in accordance with claim 2, wherein said first translating cowl comprises a slider assembly, said thrust reverser assembly further comprising a track lock coupled to the stationary cowl and configured to selectively engage said slider assembly to releasably lock said first translating cowl to the stationary cowl.

6. A thrust reverser assembly in accordance with claim 2, wherein said positioning assembly comprises a positioning member coupled to said first translating cowl, said positioning member defining a slot extending between a forward sidewall and a aft sidewall, a rod assembly extending through said slot and configured to contact said aft sidewall to move said first translating cowl from the first operational position to the third operational position and to contact said forward sidewall to move said first translating cowl from the third operational position to the first operational position.

7. A turbofan engine assembly comprising:
- a core gas turbine engine;
- a core cowl which circumscribes said core gas turbine engine;
- a nacelle positioned radially outward from said core cowl to define a fan nozzle duct between said nacelle and said core cowl, said nacelle comprising a stationary cowl;
- a thrust reverser assembly coupled to said nacelle for adjusting a thrust of said gas turbine engine, said thrust reverser assembly comprising:
  - a first translating cowl slidably coupled to said nacelle, said first translating cowl positionable with respect to said stationary cowl;
  - a second translating cowl slidably coupled to said nacelle such that said first translating cowl is positioned between said stationary cowl and said second translating cowl, said second translating cowl positionable with respect to said first translating cowl;
  - an actuator coupled to a positioning assembly, said positioning assembly operatively coupled to said first translating cowl and said second translating cowl for selectively moving said first translating cowl and said second translating cowl; and
  - an actuator lock coupled to said actuator to releasably lock said second translating cowl to the stationary cowl.

8. A turbofan engine assembly in accordance with claim 7, wherein said actuator is configured to move said first translating cowl and said second translating cowl between a first operational position, a second operational position, and a third operational position, said first translating cowl and said second translating cowl positioned adjacent said stationary cowl in the first operational position, said second translating cowl positioned a distance from said first translating cowl in the second operational position, and said first translating cowl positioned a distance from the said stationary cowl in the third operational position.

9. A turbofan engine assembly in accordance with claim 8, wherein said actuator engages said positioning assembly to move said first translating cowl between the first and third operational positions.

10. A turbofan engine assembly in accordance with claim 8, wherein said actuator comprises a plurality of cowl locks coupled to said stationary cowl to releasably lock said first translating cowl to said stationary cowl.

11. A turbofan engine assembly in accordance with claim 8, wherein said first translating cowl comprises a slider assembly, said thrust reverser assembly further comprising a track lock coupled to said stationary cowl and configured to selectively engage said slider assembly to releasably lock said first translating cowl to said stationary cowl.

12. A turbofan engine assembly in accordance with claim 8, wherein said positioning assembly includes a positioning member coupled to said first translating cowl, said positioning member defining a slot extending between a forward sidewall and a aft sidewall, a rod assembly extending through said slot and configured to contact said aft sidewall to move said first translating cowl from the first operational position to the third operational position and to contact said forward sidewall to move said first translating cowl from the third operational position to the first operational position.

13. A method for operating a turbofan engine assembly, the turbofan engine assembly including a core gas turbine engine, a core cowl which circumscribes the core gas turbine engine, a nacelle positioned radially outward from the core cowl to define a fan nozzle duct between the core cowl and a portion of the nacelle, a stationary cowl coupled to the nacelle, a first translating cowl coupled to the nacelle and positionable with respect to the stationary cowl, a second translating cowl coupled to the nacelle and positionable with respect to the first translating cowl, and a thrust reverser assembly coupled to the nacelle, said method comprising:
- selectively positioning the second translating cowl between a first operational position and a second operational position using an actuator and a positioning assembly, to adjust an area of the fan nozzle duct;
- selectively positioning the first translating cowl between the first operational position and a third operational position using the actuator and the positioning assembly, to adjust an amount of air flowing through the fan duct nozzle and the thrust reverser assembly to facilitate effecting reverse thrust of the turbofan engine assembly;

releasably locking the first translating cowl to the stationary cowl; and releasably locking the second translating cowl to the stationary cowl using an actuator lock coupled to the actuator.

14. A method in accordance with claim 13, further comprising positioning the first translating cowl and the second translating cowls adjacent the stationary cowl in the first operational position, positioning the second translating cowl a distance from the first translating cowl in the second operational position, and positioning the first translating cowl a distance from the stationary cowl in the third operational position.

15. A method in accordance with claim 14, wherein the thrust reverser assembly includes a positioning assembly coupled to the first translating cowl and an actuator operatively coupled to the first translating cowl and the second translating cowl, said method further comprises operating the actuator to engage the positioning assembly to selectively position the first translating cowl between the first and third operational positions.

16. A method in accordance with claim 15, wherein the thrust reverser assembly includes a plurality of locks coupled to the stationary cowl and configured to releasably lock the first translating cowl to the stationary cowl, said method further comprises:

locking the first translating cowl to the stationary cowl; and positioning the second translating cowl between the first and second operational positions with the first translating cowl locked to the stationary cowl.

* * * * *

UNITED STATES PATENT AND TRADEMARK OFFICE
CERTIFICATE OF CORRECTION

| | |
|---|---|
| PATENT NO. | : 8,713,911 B2 |
| APPLICATION NO. | : 12/969258 |
| DATED | : May 6, 2014 |
| INVENTOR(S) | : Joseph Thomas Kopecek and Peter William Walker |

It is certified that error appears in the above-identified patent and that said Letters Patent is hereby corrected as shown below:

In the Claims

Claim 14, Column 13, Line 13, replace "translating cowls" with -- translating cowl --

Signed and Sealed this
Fifth Day of August, 2014

Michelle K. Lee
*Deputy Director of the United States Patent and Trademark Office*